(12) United States Patent
Chen

(10) Patent No.: US 7,929,119 B2
(45) Date of Patent: Apr. 19, 2011

(54) IMAGE PICKUP DEVICE FOR DETECTING MOVING SPEED OF SHOT OBJECT AND METHOD THEREOF

(75) Inventor: Chih-Chung Chen, Chiayi (TW)

(73) Assignee: Altek Corporation, Hsinchu (TW)

( * ) Notice: Subject to any disclaimer, the term of this patent is extended or adjusted under 35 U.S.C. 154(b) by 283 days.

(21) Appl. No.: 12/408,763

(22) Filed: Mar. 23, 2009

(65) Prior Publication Data
US 2010/0066588 A1    Mar. 18, 2010

(30) Foreign Application Priority Data
Sep. 17, 2008  (TW) ............................... 97135711 A

(51) Int. Cl.
*G01P 3/36*  (2006.01)
(52) U.S. Cl. ....................................... 356/28; 356/28.5
(58) Field of Classification Search ........ 356/3.01–3.15, 356/4.01–4.1, 5.01–5.15, 6–22, 28, 28.5
See application file for complete search history.

(56) References Cited

U.S. PATENT DOCUMENTS
6,628,804 B1 *  9/2003  Edanami ....................... 382/107
* cited by examiner

*Primary Examiner* — Thomas H Tarcza
*Assistant Examiner* — Luke D Ratcliffe
(74) *Attorney, Agent, or Firm* — Stevens & Showalter LLP

(57) ABSTRACT

An image pickup device for detecting a moving speed of a shot object and a method thereof are described. First, a coordinate of the image pickup device and a coordinate of the shot object are obtained at a first time point. Next, a coordinate of the image pickup device and a coordinate of the shot object are obtained at a second time point. Then, a moving distance of the shot object is calculated according to the coordinates of the shot object at the first and second time points. A moving speed of the shot object is calculated according to a time difference and the moving distance. Afterward, the obtained moving speed is displayed on the image pickup device, such that the user knows about the moving speed of the shot object.

6 Claims, 10 Drawing Sheets

IMAGE PICKUP DEVICE FOR DETECTING MOVING SPEED OF SHOT OBJECT AND METHOD THEREOF

CROSS-REFERENCE TO RELATED APPLICATIONS

This non-provisional application claims priority under 35 U.S.C. §119(a) on Patent Application No(s). 097135711 filed in Taiwan, R.O.C. on Sep. 17, 2008 the entire contents of which are hereby incorporated by reference.

BACKGROUND OF THE INVENTION

1. Field of Invention

The present invention relates to a method for detecting a moving speed, and more particularly to an image pickup device for detecting a moving speed of a shot object and a method thereof.

2. Related Art

Global positioning system (GPS), a medium earth orbit satellite navigation system, is capable of providing accurate positioning, speed measurement, and high-precision time standard for most of (98% of) the regions on the surface of the earth. Under the research and maintenance of the US Department of Defense, the GPS can be employed to continuously and precisely determine three-dimensional positions, three-dimensional movements, and time required by military users at any place or near-ground space worldwide. The system has 24 GPS satellites in space, and has 1 master station, 3 data injection stations, 5 monitoring stations, and a GPS receiver as a client on the ground. The position and altitude of the client on the earth can be quickly determined by using a minimum of 4 satellites. With more linked satellites, the decoded position will be more precise.

The GPS is characterized in being not affected by weather, having a high global coverage (98%), and being capable of mobile positioning. Therefore, in addition to the military purposes, this system is greatly applied in civil navigation (such as airplane navigation, ship navigation, and vehicle navigation) and positioning (such as vehicle anti-theft and mobile communication device positioning).

Recently, many manufacturers install the GPS in digital cameras and video cameras, for displaying the shooting position in the shot pictures or films. For the recently popular GPS pictures, the GPS is installed in the image pickup device to automatically record the GPS coordinate during shooting, such that the user is able to keep a personal traveling log.

However, currently, the user may only figure out the position of the image pickup device from the pictures shot by the image pickup device with the GPS, and has no idea of the position and the moving speed of the shot object.

SUMMARY OF THE INVENTION

Accordingly, the present invention is directed to an image pickup device for detecting a moving speed of a shot object and a method thereof, so as to inform the user of a moving speed of the shot object.

An image pickup device for detecting a moving speed of a shot object includes a global positioning system (GPS) receiver, an image pickup module, an elevation measurement device, a north finder, and an operation unit.

The GPS receiver obtains a first longitude, a first latitude, and a first altitude at a first time point, and a third longitude, a third latitude, and a third altitude at a second time point.

The image pickup module focuses on a shot object, so as to obtain a first focus distance at the first time point and a second focus distance at the second time point.

The elevation measurement device measures a first elevation angle and a second elevation angle respectively formed by the image pickup device with a horizontal direction at the first and the second time point.

The north finder measures a first horizontal angle and a second horizontal angle respectively formed by the image pickup device with a due north direction at the first and the second time point.

The operation unit calculates a second longitude, a second latitude, and a second altitude of a position of the shot object at the first time point according to the first longitude, the first latitude, the first altitude, the first focus distance, the first elevation angle, and the first horizontal angle, calculates a fourth longitude, a fourth latitude, and a fourth altitude of a position of the shot object at the second time point according to the third longitude, the third latitude, the third altitude, the second focus distance, the second elevation angle, and the second horizontal angle, calculates a moving distance of the shot object according to the second longitude, the second latitude, the second altitude, the fourth longitude, the fourth latitude, and the fourth altitude, and calculates a moving speed of the shot object in a time difference according to the time difference between the first time point and the second time point as well as the moving distance.

The image pickup device for detecting a moving speed of a shot object further includes a display unit, electrically connected to the operation unit, for displaying the moving speed of the shot object in the time difference.

A method for detecting a moving speed of a shot object is applied to an image pickup device, for obtaining a moving speed of a shot object. The method includes the following steps.

First, a first longitude, a first latitude, and a first altitude of a position of the image pickup device are obtained. Next, an image pickup module of the image pickup device focuses on the shot object, and a first focus distance of the image pickup module to the shot object is obtained. When the image pickup module focuses on the shot object, a first elevation angle formed by the image pickup device with a horizontal direction is measured. When the image pickup module focuses on the shot object, a first horizontal angle formed by the image pickup device with a due north direction is measured. Then, a second longitude, a second latitude, and a second altitude of a position of the shot object are calculated according to the first longitude, the first latitude, the first altitude, the first focus distance, the first elevation angle, and the first horizontal angle.

After a time difference, a third longitude, a third latitude, and a third altitude of a position of the image pickup device are obtained. After the time difference, the image pickup module of the image pickup device focuses on the shot object, and a second focus distance of the image pickup module to the shot object is obtained. When the image pickup module focuses on the shot object after the time difference, a second elevation angle formed by the image pickup device with the horizontal direction is obtained. When the image pickup module focuses on the shot object after the time difference, a second horizontal angle formed by the image pickup device with the due north direction is obtained. Then, a fourth longitude, a fourth latitude, and a fourth altitude of a position of the shot object after the time difference are calculated according to the third longitude, the third latitude, the third altitude, the second focus distance, the second elevation angle, and the second horizontal angle. A moving distance of the shot object in the time difference is calculated according to the second longitude, the second latitude, the second altitude, the fourth longitude, the fourth latitude, and the fourth altitude. Finally, a moving speed of the shot object in the time difference is calculated according to the time difference and the moving distance.

The step of calculating the second longitude, the second latitude, and the second altitude of the position of the shot object includes the following steps. First, a first height difference and a first horizontal distance difference between the shot object and the image pickup device are calculated according to the first focus distance and the first elevation angle. Next, a first longitude difference and a first latitude difference between the shot object and the image pickup device are calculated according to the first horizontal distance difference and the first horizontal angle. Then, the first longitude difference and the first longitude are aggregated to obtain the second longitude. The first latitude difference and the first latitude are aggregated to obtain the second latitude. Finally, the first height difference and the first altitude are aggregated to obtain the second altitude.

The step of calculating the fourth longitude, the fourth latitude, and the fourth altitude of the position of the shot object includes the following steps. First, a second height difference and a second horizontal distance difference between the shot object and the image pickup device are calculated according to the second focus distance and the second elevation angle. Next, a second longitude difference and a second latitude difference between the shot object and the image pickup device are calculated according to the second horizontal distance difference and the second horizontal angle. Then, the second longitude difference and the third longitude are aggregated to obtain the fourth longitude. The second latitude difference and the third latitude are aggregated to obtain the fourth latitude. Finally, the second height difference and the third altitude are aggregated to obtain the fourth altitude.

The method for detecting a moving speed of a shot object further includes displaying the moving speed of the shot object in the time difference.

According to the image pickup device for detecting a moving speed of a shot object and the method thereof provided by the present invention, at the first time point, the position of the image pickup device is first obtained through the GPS installed in the image pickup device. The first focus distance between the image pickup device and the shot object is obtained by the image pickup module. The first elevation angle formed by the image pickup device with the horizontal direction and the first horizontal angle formed by the image pickup device with the due north direction are respectively obtained by the elevation measurement device and the north finder. Afterward, the first longitude difference, the first latitude difference, and the first height difference between the shot object and the image pickup device are calculated through a trigonometric function. Then, the first longitude, the first latitude, and the first altitude of the position of the image pickup device and the first longitude difference, the first latitude difference, and the first height difference between the shot object and the image pickup device are aggregated to obtain the second longitude, the second latitude, and the second altitude of the position of the shot object at the first time point.

At the second time point, the position of the image pickup device is first obtained through the GPS installed in the image pickup device. The second focus distance between the image pickup device and the shot object is obtained by the image pickup module. The second elevation angle formed by the image pickup device with the horizontal direction and the second horizontal angle formed by the image pickup device with the due north direction are respectively obtained by the elevation measurement device and the north finder. Afterward, the second longitude difference, the second latitude difference, and the second height difference between the shot object and the image pickup device are calculated through the trigonometric function. Then, the third longitude, the third latitude, and the third altitude of the position of the image pickup device and the second longitude difference, the second latitude difference, and the second height difference between the shot object and the image pickup device are aggregated to obtain the fourth longitude, the fourth latitude, and the fourth altitude of the position of the shot object at the second time point.

According to the positions of the shot object at the first and the second time point, the moving distance of the shot object in the time difference between the first and the second time point are calculated. The moving speed of the shot object in the time difference is obtained according to the time difference and the moving distance. Then, the moving speed of the shot object in the time difference is displayed on the display unit, such that it is convenient for the user to view the moving speed of the shot object.

BRIEF DESCRIPTION OF THE DRAWINGS

The present invention will become more fully understood from the detailed description given herein below for illustration only, and thus are not limitative of the present invention, and wherein.

DETAILED DESCRIPTION OF THE INVENTION

Figure 1:
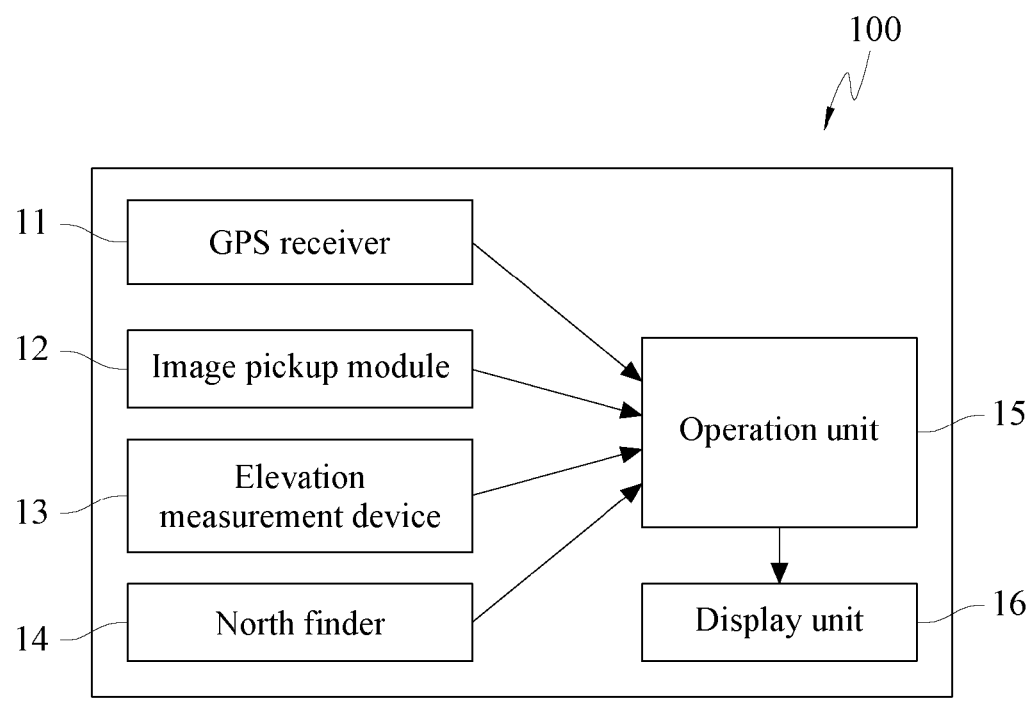
FIG. 1 is a schematic view of an image pickup device for detecting a moving speed of a shot object according to the present invention.

FIG. 1 is a schematic view of an image pickup device for detecting a moving speed of a shot object according to the present invention.

In FIG. 1, an image pickup device 100 for detecting a moving speed of a shot object includes a global positioning system (GPS) receiver 11, an image pickup module 12, an elevation measurement device 13, a north finder 14, an operation unit 15, and a display unit 16.

The GPS receiver 11 obtains a GPS coordinate (i.e., a first longitude, a first latitude, and a first altitude) at a first time point, and a GPS coordinate (i.e., a third longitude, a third latitude, and a third altitude) at a second time point.

The image pickup module 12 focuses on the shot object at the first time point and the second time point, so as to obtain a first focus distance at the first time point and a second focus distance at the second time point.

The elevation measurement device 13 measures a first elevation angle and a second elevation angle respectively formed by the image pickup device 100 for detecting a moving speed of a shot object with a horizontal direction at the first and the second time point.

The north finder 14 measures a first horizontal angle and a second horizontal angle respectively formed by the image pickup device 100 for detecting a moving speed of a shot object with a due north direction at the first and the second time point. Definitely, the north finder 14 may measure a first horizontal angle and a second horizontal angle respectively formed by the image pickup device 100 for detecting a moving speed of a shot object with a due south direction at the first and the second time point.

The operation unit 15 calculates a second longitude, a second latitude, and a second altitude of a position of the shot object at the first time point according to the first longitude, the first latitude, the first altitude, the first focus distance, the first elevation angle, and the first horizontal angle.

The operation unit 15 calculates a fourth longitude, a fourth latitude, and a fourth altitude of a position of the shot object at the second time point according to the third longitude, the third latitude, the third altitude, the second focus distance, the second elevation angle, and the second horizontal angle.

The operation unit 15 calculates a moving distance of the shot object according to the second longitude, the second latitude, the second altitude, the fourth longitude, the fourth latitude, and the fourth altitude, and calculates a moving speed of the shot object in a time difference according to the time difference between the first time point and the second time point as well as the moving distance.

The display unit 16 is electrically connected to the operation unit 15, for displaying the moving speed.

The image pickup module 12 may include a lens group, a stepping motor, an image sensing element, and a processing unit. The stepping motor controls a pitch of the lens group to adjust the focal length, so as to focus on the shot object. The image of the shot object is projected onto the image sensing element by the lens group. The processing unit analyzes whether the image received by the image sensing element is focused on the shot object, and the focus distance between the image pickup device 100 for detecting a moving speed of a shot object and the shot object is calculated by the combination of the focal length of each lens in the lens group.

The elevation measurement device 13 may be a gyro or other devices.

The north finder 14 may be a north indicator, a south indicator, or other devices attracted by the geomagnetic force and having a fixed direction.

The operation unit 15 may be a microprocessor. In particular, the operation unit 15 refers to a single microprocessor, or a plurality of microprocessors.

The display unit 16 may be a liquid crystal display (LCD), a light emitting diode (LED) display, or an organic light emitting diode (OLED) display.

Figure 2:
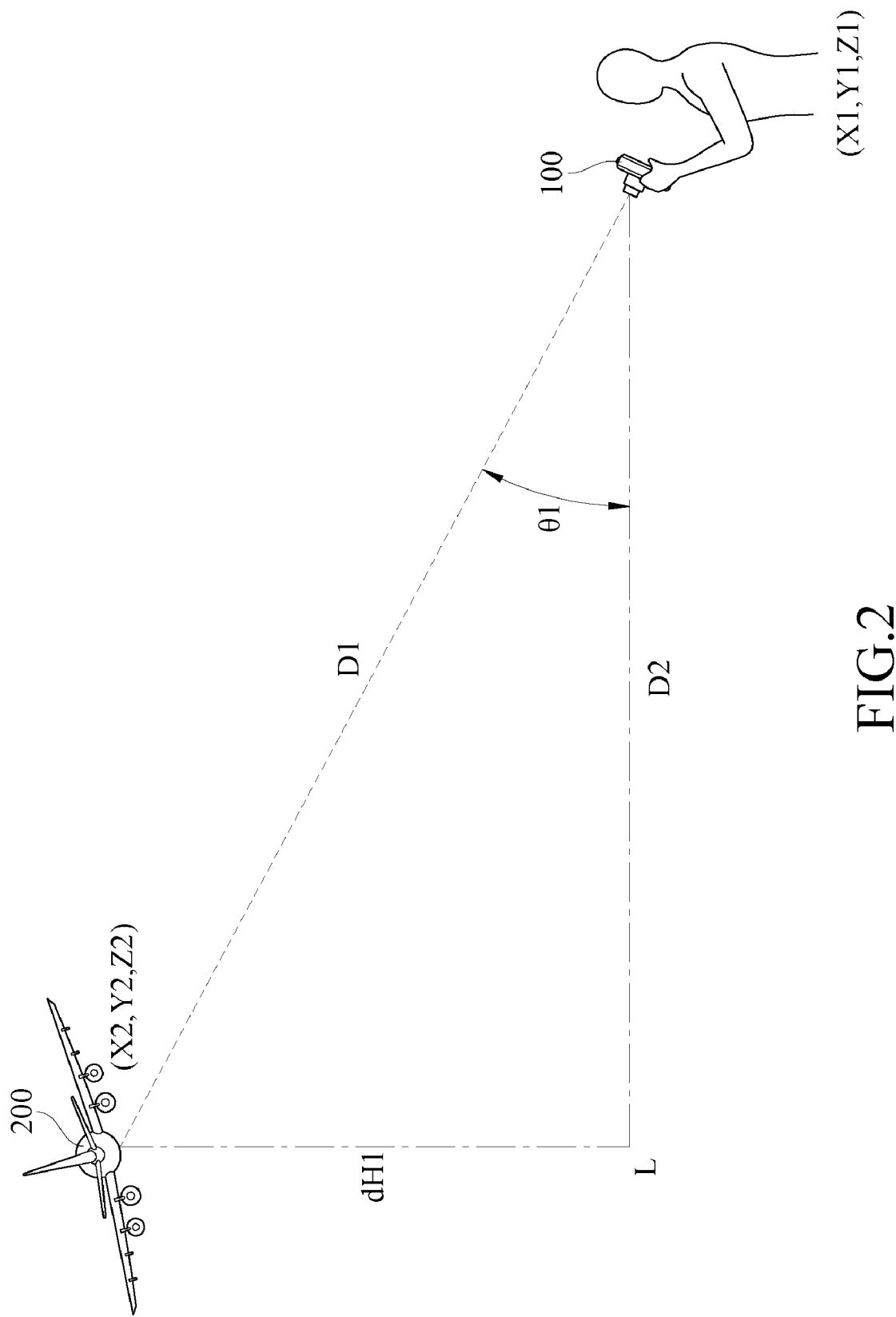
FIG. 2 is a schematic view showing an angle formed by the image pickup device for detecting a moving speed of a shot object with a horizontal direction when focusing on the shot object at a first time point.
Figure 3:
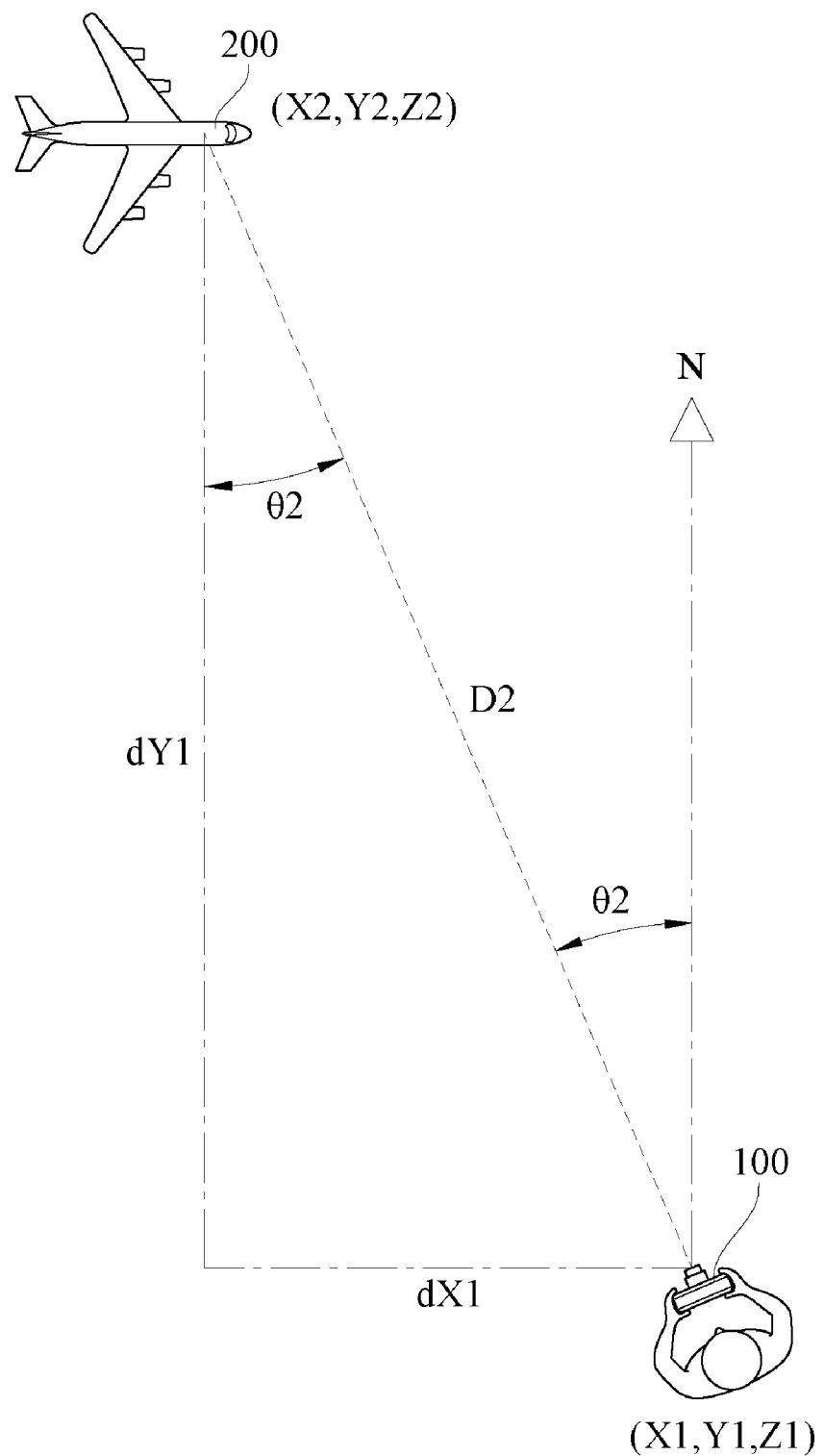
FIG. 3 is a schematic view showing an angle formed by the image pickup device for detecting a moving speed of a shot object with a due north direction when focusing on the shot object at the first time point.

Referring to FIGS. 2, 3, and 1, FIG. 2 is a schematic view showing an angle formed by the image pickup device for detecting a moving speed of a shot object with the horizontal direction when focusing on the shot object at the first time point, and FIG. 3 is a schematic view showing an angle formed by the image pickup device for detecting a moving speed of a shot object with the due north direction when focusing on the shot object at the first time point.

In FIG. 2, at the first time point, a GPS coordinate (X1, Y1, Z1) of the position of the image pickup device 100 for detecting a moving speed of a shot object is first obtained. X1, Y1, and Z1 are respectively a first longitude, a first latitude, and a first altitude of the position of the image pickup device 100 at the first time point.

The stepping motor adjusts the pitch of the lens group in the image pickup module 12, so as to focus on a shot object 200 (for example, an airplane, automobile, or mountain). The processing unit in the image pickup module 12 analyzes whether the received image of the shot object 200 is focused on the shot object 200, and a first focus distance D1 between the image pickup device 100 for detecting a moving speed of a shot object and the shot object 200 is calculated by the combination of the focal length of each lens in the lens group.

At the first time point, when the image pickup module 12 focuses on the shot object 200, the elevation measurement device 13 in the image pickup device 100 for detecting a moving speed of a shot object measures a first elevation angle $\theta 1$ formed by the image pickup device 100 with a horizontal direction L. According to the first focus distance D1 and the first elevation angle $\theta 1$, a formula a and a formula b are calculated through a trigonometric function.

$$D2 = D1 \times \cos \theta 1 \qquad \text{formula a}$$

$$dH1 = D1 \times \sin \theta 1 \qquad \text{formula b}$$

D2 is a first horizontal distance difference between the shot object 200 and the image pickup device 100 for detecting a moving speed of a shot object. dH1 is a first height difference between the shot object 200 and the image pickup device 100 for detecting a moving speed of a shot object.

In FIG. 3, at the first time point, when the image pickup module 12 focuses on the shot object 200, the north finder 14 in the image pickup device 100 for detecting a moving speed of a shot object measures a first horizontal angle $\theta 2$ formed by the image pickup device 100 with a due north direction N. According to the formula a, the first horizontal distance difference D2, and the first horizontal angle $\theta 2$, a formula c and a formula d are calculated through the trigonometric function.

$$dX1 = D2 \times \sin \theta 2 = D1 \times \cos \theta 1 \times \sin \theta 2 \qquad \text{formula c}$$

$$dY1 = D2 \times \cos \theta 2 = D1 \times \cos \theta 1 \times \cos \theta 2 \qquad \text{formula d}$$

dX1 is a first longitude difference between the shot object 200 and the image pickup device 100 for detecting a moving speed of a shot object. dY1 is a first latitude difference between the shot object 200 and the image pickup device 100 for detecting a moving speed of a shot object.

The longitude and the latitude are calculated with 0 degree east longitude and 0 degree north latitude as a datum. $\theta 2$ is calculated from the due north direction N, so the first longitude difference dX1 calculated through the trigonometric function is opposite to the metering increasing direction of the first longitude X1. Therefore, the aggregation of the first longitude X1 and the first longitude difference dX1 must be performed in a subtracting manner. According to the first longitude X1, the first latitude Y1, the first altitude Z1, the formula b, the formula c, and the formula d, a formula e, a formula f, and a formula g are calculated.

$$X2=X1-dX1=X1-D2\times\text{Sin }\theta2=X1-D1\times\text{Cos }\theta1\times\text{Sin }\theta2 \qquad \text{formula e}$$

$$Y2=Y1+dY1=Y1+D1'\times\text{Cos }\theta2=Y1+D1\times\text{Cos }\theta1\times\text{Cos }\theta2 \qquad \text{formula f}$$

$$Z2=Z1+dH1=Z1+D1\times\text{Sin }\theta1 \qquad \text{formula g}$$

X2, Y2, and Z2 are respectively a second longitude, a second latitude, and a second altitude of the position of the shot object 200 at the first time point. X2, Y2, and Z2 obtained by the above formulae are the GPS coordinate (X2, Y2, Z2) of the position of the shot object 200 at the first time point.

Figure 4:
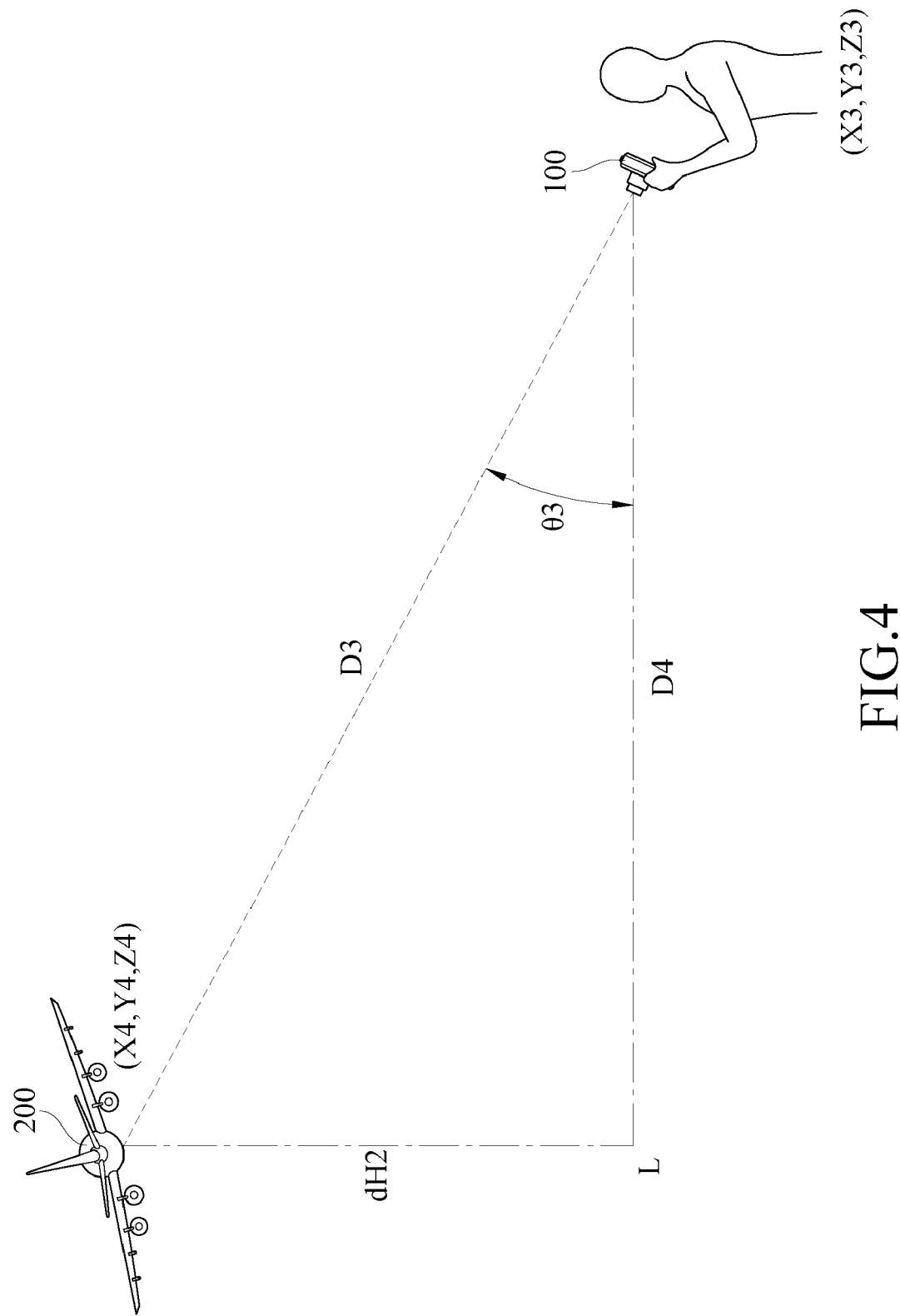
FIG. 4 is a schematic view showing an angle formed by the image pickup device for detecting a moving speed of a shot object with the horizontal direction when focusing on the shot object at a second time point.
Figure 5:
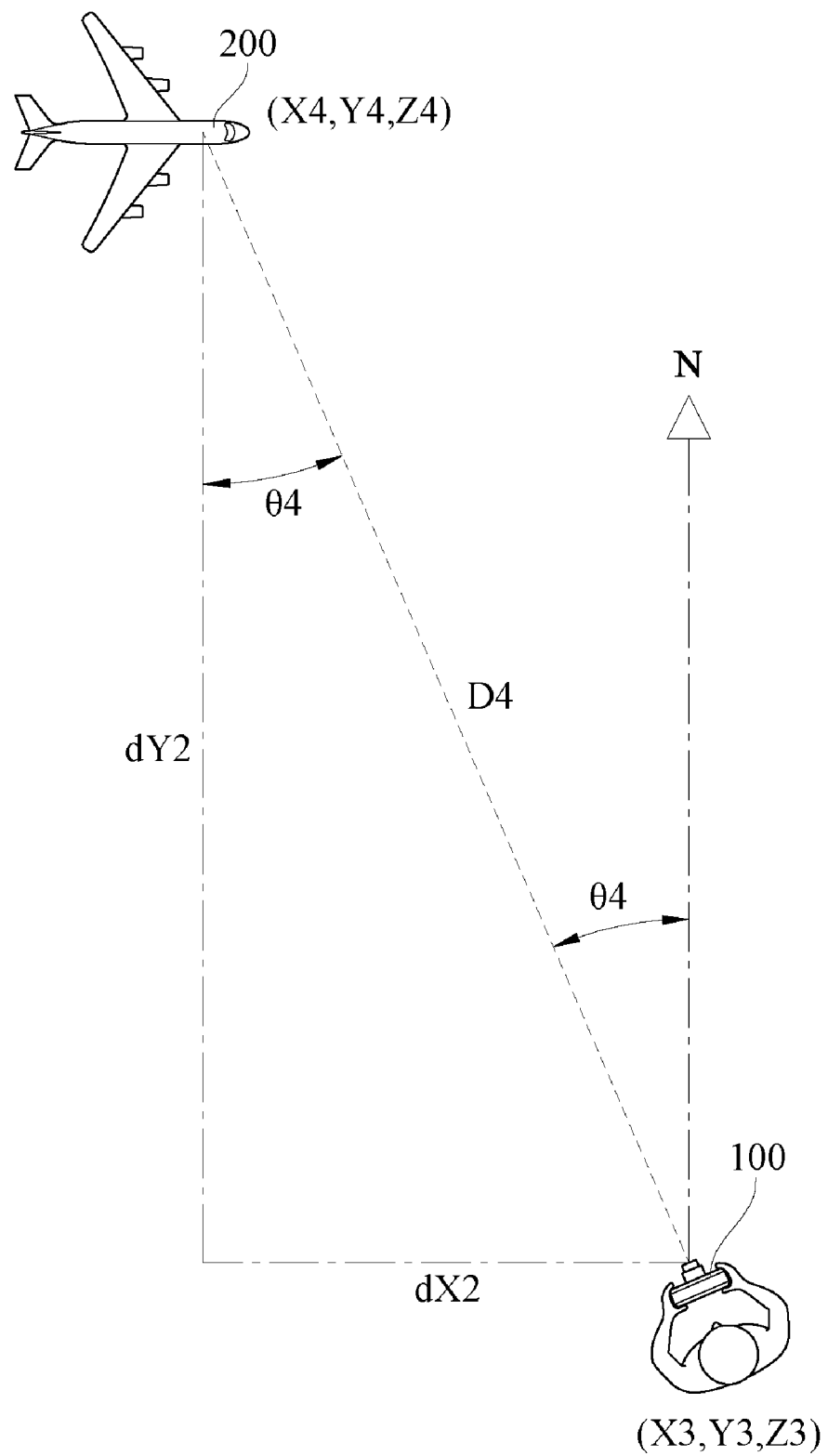
FIG. 5 is a schematic view showing an angle formed by the image pickup device for detecting a moving speed of a shot object with the due north direction when focusing on the shot object at the second time point.

Referring to FIGS. 4 and 5 together with FIGS. 1 to 3, FIG. 4 is a schematic view showing an angle formed by the image pickup device for detecting a moving speed of a shot object with the horizontal direction when focusing on the shot object at the second time point, and FIG. 5 is a schematic view showing an angle formed by the image pickup device for detecting a moving speed of a shot object with the due north direction when focusing on the shot object at the second time point.

In FIG. 4, at the second time point, a GPS coordinate (X3, Y3, Z3) of the position of the image pickup device 100 for detecting a moving speed of a shot object is first obtained. X3, Y3, and Z3 are respectively a third longitude, a third latitude, and a third altitude of the position of the image pickup device 100 at the second time point.

The stepping motor adjusts the pitch of the lens group in the image pickup module 12, so as to focus on the shot object 200 (for example, an airplane, automobile, or mountain). The processing unit in the image pickup module 12 analyzes whether the received image of the shot object 200 is focused on the shot object 200, and a second focus distance D3 between the image pickup device 100 for detecting a moving speed of a shot object and the shot object 200 is calculated by the combination of the focal length of each lens in the lens group.

At the second time point, when the image pickup module 12 focuses on the shot object 200, the elevation measurement device 13 in the image pickup device 100 for detecting a moving speed of a shot object measures a second elevation angle θ3 formed by the image pickup device 100 with the horizontal direction L. According to the second focus distance D3 and the second elevation angle θ3, a formula h and a formula i are calculated through the trigonometric function.

$$D4=D3\times\text{Cos }\theta3 \qquad \text{formula h}$$

$$dH2=D3\times\text{Sin }\theta3 \qquad \text{formula i}$$

D4 is a second horizontal distance difference between the shot object 200 and the image pickup device 100 for detecting a moving speed of a shot object. dH2 is a second height difference between the shot object 200 and the image pickup device 100 for detecting a moving speed of a shot object.

In FIG. 5, at the second time point, when the image pickup module 12 focuses on the shot object 200, the north finder 14 in the image pickup device 100 for detecting a moving speed of a shot object measures a second horizontal angle θ4 formed by the image pickup device 100 with the due north direction N. According to the formula h, the second horizontal distance difference D4, and the second horizontal angle θ4, a formula j and a formula k are calculated through the trigonometric function.

$$dX2=D4\times\text{Sin }\theta4=D3\times\text{Cos }\theta3\times\text{Sin }\theta4 \qquad \text{formula j}$$

$$dY2=D4\times\text{Cos }\theta4=D3\times\text{Cos }\theta3\times\text{Cos }\theta4 \qquad \text{formula k}$$

dX2 is a second longitude difference between the shot object 200 and the image pickup device 100 for detecting a moving speed of a shot object. dY2 is a second latitude difference between the shot object 200 and the image pickup device 100 for detecting a moving speed of a shot object.

The longitude and the latitude are calculated with 0 degree east longitude and 0 degree north latitude as a datum. θ4 is calculated from the due north direction N, so the second longitude difference dX2 calculated through the trigonometric function is opposite to the metering increasing direction of the third longitude X3. Therefore, the aggregation of the third longitude X3 and the second longitude difference dX2 must be performed in a subtracting manner. According to the third longitude X3, the third latitude Y3, the third altitude Z3, the formula i, the formula j, and the formula k, a formula l, a formula m, and a formula n are calculated.

$$X4\times X3-dX2=X3-D4\times\text{Sin }\theta4\times X3-D3\times\text{Cos }\theta3\times\text{Sin }\theta4 \qquad \text{formula l}$$

$$Y4=Y3+dY2=Y3+D4\times\text{Cos }\theta4=Y3+D3\times\text{Cos }\theta3\times\text{Cos }\theta4 \qquad \text{formula m}$$

$$Z4=Z3+dH2=Z3+D3\times\text{Sin }\theta3 \qquad \text{formula n}$$

X4, Y4, and Z4 are a fourth longitude, a fourth latitude, and a fourth altitude of the position of the shot object 200 at the second time point. X4, Y4, and Z4 obtained by the above formulae are the GPS coordinate (X4, Y4, Z4) of the position of the shot object 200 at the second time point.

Figure 6:
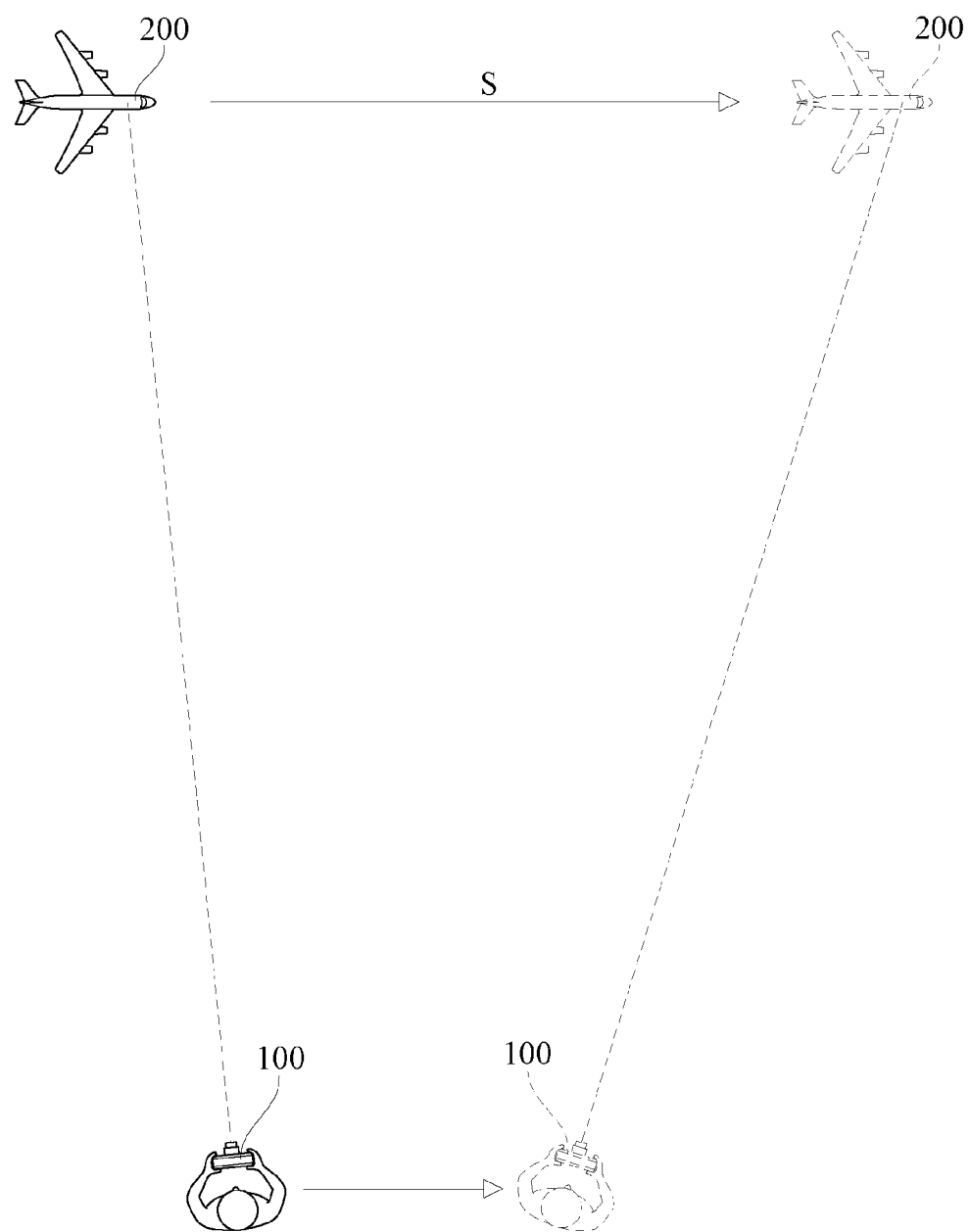
FIG. 6 is a schematic view showing the movement of the image pickup device for detecting a moving speed of a shot object and the shot object in a time difference between the first time point and the second time point.

Referring to FIG. 6 together with FIGS. 1 to 5, FIG. 6 is a schematic view showing the movement of the image pickup device for detecting a moving speed of a shot object and the shot object in the time difference between the first time point and the second time point.

At the first time point, the GPS coordinate (X1, Y1, Z1) of the image pickup device 100 for detecting a moving speed of a shot object is composed of the first longitude X1, the first latitude Y1, and the first altitude Z1. The GPS coordinate (X2, Y2, Z2) of the shot object 200 is composed of the second longitude X2, the second latitude Y2, and the second altitude Z2.

At the second time point, the GPS coordinate (X3, Y3, Z3) of the image pickup device 100 for detecting a moving speed of a shot object is composed of the third longitude X3, the third latitude Y3, and the third altitude Z3. The GPS coordinate (X4, Y4, Z4) of the shot object 200 is composed of the fourth longitude X4, the fourth latitude Y4, and the fourth altitude Z4.

According to the position (X2, Y2, Z2) at the first time point and the position (X4, Y4, Z4) at the second time point of the shot object 200, a moving distance S of the shot object 200 in a time difference dt between the first time point and the second time point is calculated by using the Pythagorean theorem.

$$S=\sqrt{(X4-X2)^2+(Y4-Y2)^2+(Z4-Z2)^2} \qquad \text{formula f}$$

According to the time difference dt and the moving distance S, a moving speed V of the shot object 200 can be calculated.

$$V=\frac{\sqrt{(X4-X2)^2+(Y4-Y2)^2+(Z4-Z2)^2}}{dt} \qquad \text{formula g}$$

Figure 7A:
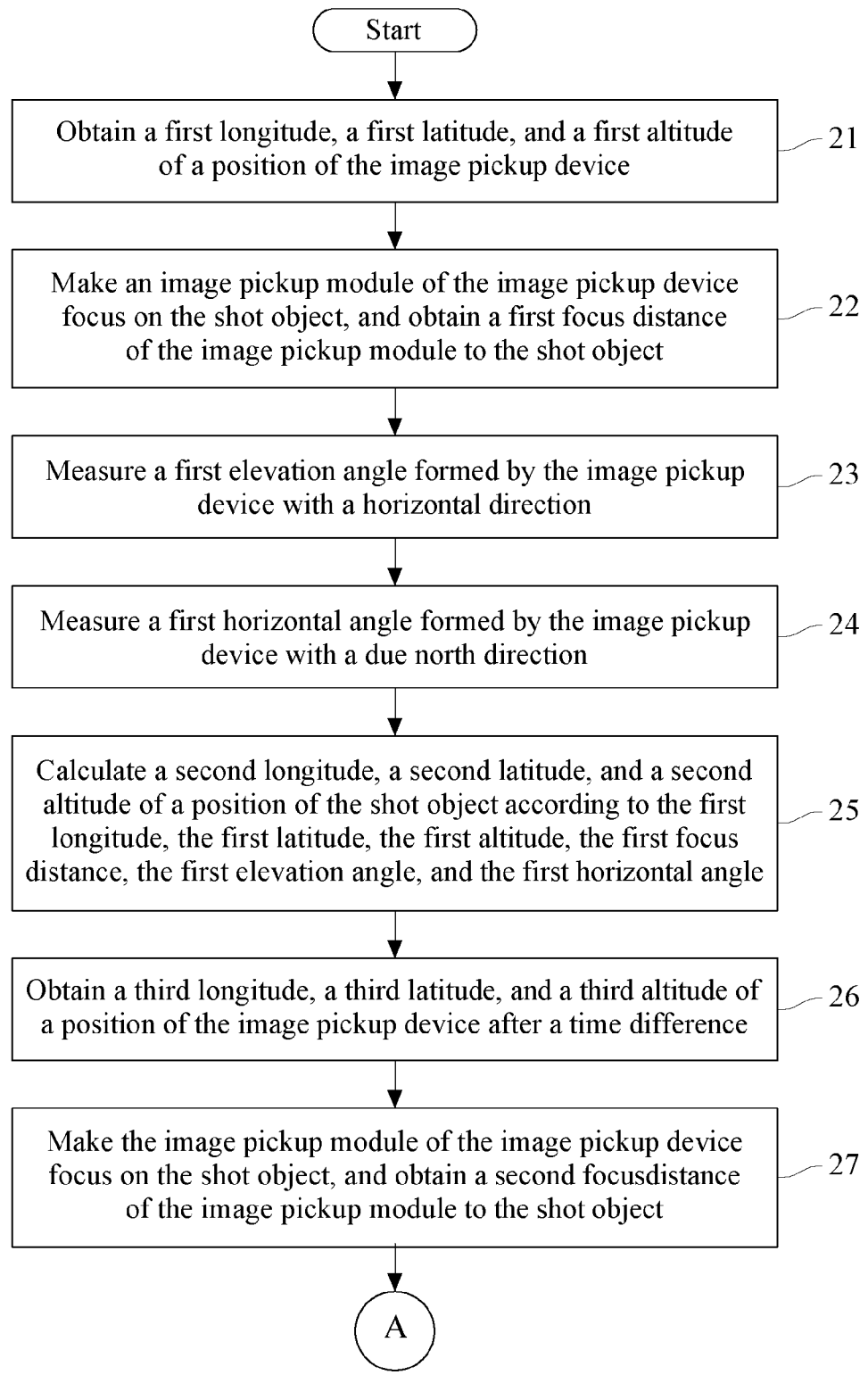
FIGS. 7A, and 7B are a flow chart of a method for detecting a moving speed of a shot object according to a first embodiment of the present invention.
Figure 7B:
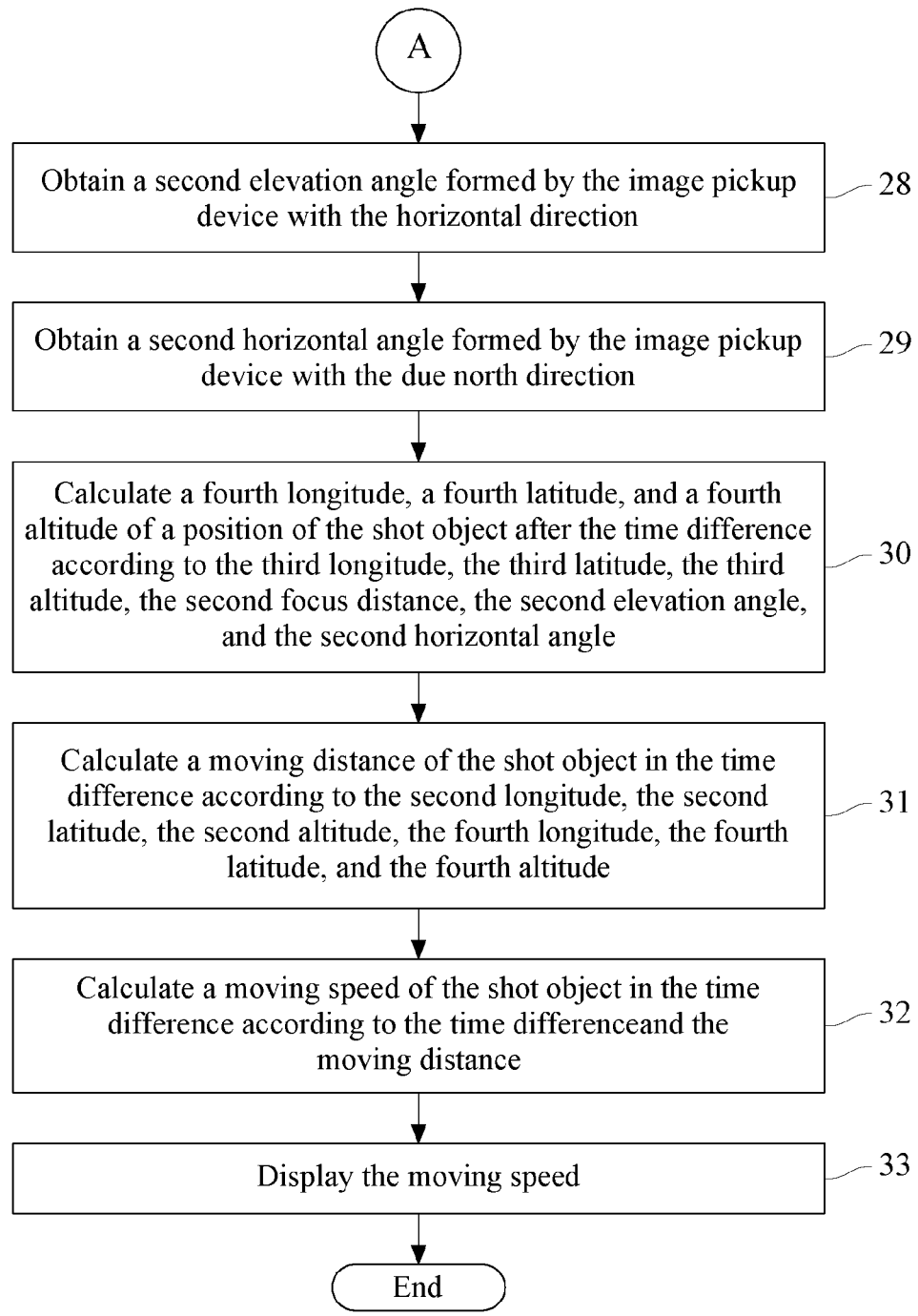
Figure 8:
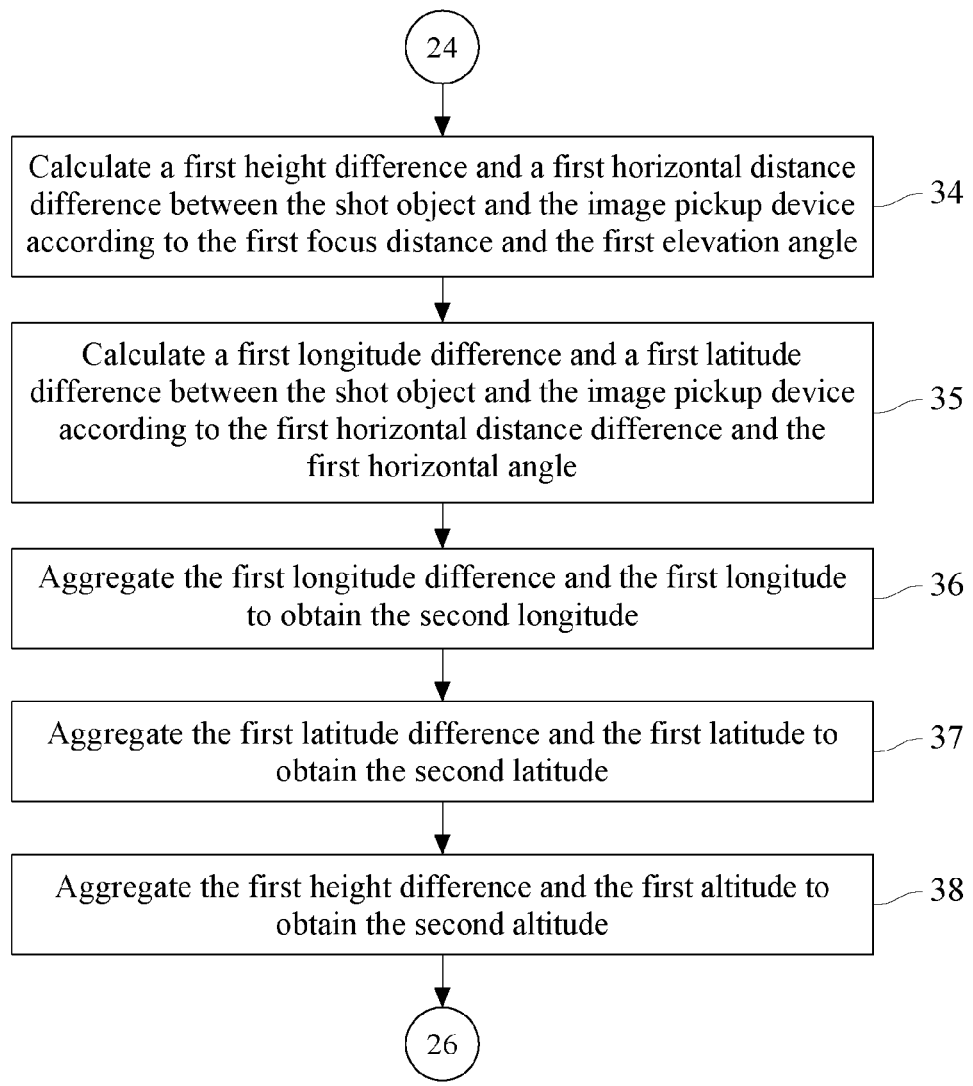
FIG. 8 is a flow chart of a method for detecting a moving speed of a shot object according to a second embodiment of the present invention.

FIGS. 7A, and 7B are a flow chart of a method for detecting a moving speed of a shot object according to a first embodiment of the present invention.

The method for detecting a moving speed of a shot object is applied to an image pickup device, for obtaining a moving speed of a shot object. The method includes the following steps. First, a first longitude, a first latitude, and a first altitude of a position of the image pickup device are obtained (Step 21). Next, an image pickup module of the image pickup device focuses on the shot object, and a first focus distance of the image pickup module to the shot object is obtained (Step 22). When the image pickup module focuses on the shot object, a first elevation angle formed by the image pickup device with a horizontal direction is measured (Step 23). When the image pickup module focuses on the shot object, a first horizontal angle formed by the image pickup device with a due north direction is measured (Step 24). Then, a second longitude, a second latitude, and a second altitude of a position of the shot object are calculated according to the first longitude, the first latitude, the first altitude, the first focus distance, the first elevation angle, and the first horizontal angle (Step 25). After a time difference, a third longitude, a third latitude, and a third altitude of a position of the image pickup device are obtained (Step 26). After the time difference, the image pickup module of the image pickup device focuses on the shot object, and a second focus distance of the image pickup module to the shot object is obtained (Step 27). After the time difference, when the image pickup module focuses on the shot object, a second elevation angle formed by the image pickup device with the horizontal direction is obtained (Step 28). After the time difference, when the image pickup module focuses on the shot object, a second horizontal angle formed by the image pickup device with the due north direction is obtained (Step 29). Thus, a fourth longitude, a fourth latitude, and a fourth altitude of a position of the shot object after the time difference are calculated according to the third longitude, the third latitude, the third altitude, the second focus distance, the second elevation angle, and the second horizontal angle (Step 30). A moving distance of the shot object in the time difference is calculated according to the second longitude, the second latitude, the second altitude, the fourth longitude, the fourth latitude, and the fourth altitude (Step 31). A moving speed of the shot object in the time difference is calculated according to the time difference and the moving distance (Step 32). Finally, the moving speed is displayed (Step 33).

Figure 9:
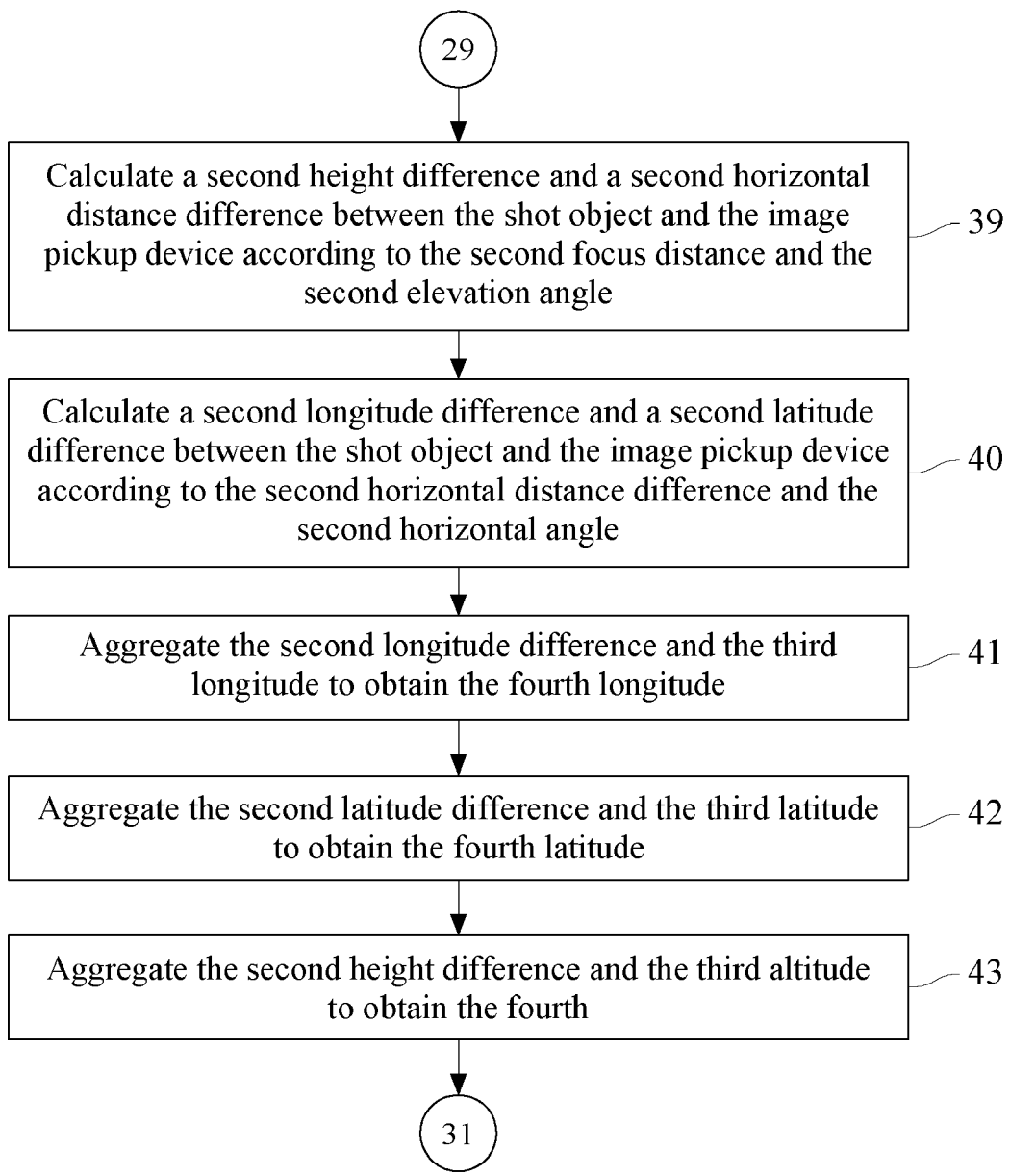
FIG. 9 is a flow chart of a method for detecting a moving speed of a shot object according to a third embodiment of the present invention.

Referring to FIGS. 8, 9, 7A, and 7B, FIG. 8 is a flow chart of a method for detecting a moving speed of a shot object according to a second embodiment of the present invention, and FIG. 9 is a flow chart of a method for detecting a moving speed of a shot object according to a third embodiment of the present invention.

Step 25 in FIG. 7A further includes the following substeps. A first height difference and a first horizontal distance difference between the shot object and the image pickup device are calculated according to the first focus distance and the first elevation angle (Step 34). Then, a first longitude difference and a first latitude difference between the shot object and the image pickup device are calculated according to the first horizontal distance difference and the first horizontal angle (Step 35). The first longitude difference and the first longitude are aggregated to obtain the second longitude (Step 36). The first latitude difference and the first latitude are aggregated to obtain the second latitude (Step 37). Finally, the first height difference and the first altitude are aggregated to obtain the second altitude (Step 38).

Step 30 in FIG. 7B further includes the following substeps. A second height difference and a second horizontal distance difference between the shot object and the image pickup device are calculated according to the second focus distance and the second elevation angle (Step 39). Then, a second longitude difference and a second latitude difference between the shot object and the image pickup device are calculated according to the second horizontal distance difference and the second horizontal angle (Step 40). The second longitude difference and the third longitude are aggregated to obtain the fourth longitude (Step 41). The second latitude difference and the third latitude are aggregated to obtain the fourth latitude (Step 42). Finally, the second height difference and the third altitude are aggregated to obtain the fourth altitude (Step 43).

According to the image pickup device for detecting a moving speed of a shot object and the method thereof provided by the present invention, at the first time point, the position of the image pickup device is first obtained through the GPS installed in the image pickup device. The first focus distance between the image pickup device and the shot object is obtained by the image pickup module. The first elevation angle formed by the image pickup device with the horizontal direction and the first horizontal angle formed by the image pickup device with the due north direction are respectively obtained by the elevation measurement device and the north finder. Afterward, the first longitude difference, the first latitude difference, and the first height difference between the shot object and the image pickup device are calculated through a trigonometric function. Then, the first longitude, the first latitude, and the first altitude of the position of the image pickup device and the first longitude difference, the first latitude difference, and the first height difference between the shot object and the image pickup device are aggregated to obtain the second longitude, the second latitude, and the second altitude of the position of the shot object at the first time point.

At the second time point, the position of the image pickup device is first obtained through the GPS installed in the image pickup device. The second focus distance between the image pickup device and the shot object is obtained by the image pickup module. The second elevation angle formed by the image pickup device with the horizontal direction and the second horizontal angle formed by the image pickup device with the due north direction are respectively obtained by the elevation measurement device and the north finder. Afterward, the second longitude difference, the second latitude difference, and the second height difference between the shot object and the image pickup device are calculated through the trigonometric function. Then, the third longitude, the third latitude, and the third altitude of the position of the image pickup device and the second longitude difference, the second latitude difference, and the second height difference between the shot object and the image pickup device are aggregated to obtain the fourth longitude, the fourth latitude, and the fourth altitude of the position of the shot object at the second time point.

According to the positions of the shot object at the first and the second time point, the moving distance of the shot object in the time difference between the first and the second time point are calculated. The moving speed of the shot object in the time difference is obtained according to the time difference and the moving distance. Then, the moving speed of the shot object in the time difference is displayed on the display unit, such that it is convenient for the user to view the moving speed of the shot object.

What is claimed is:

1. An image pickup device for detecting a moving speed of a shot object, comprising:
   a global positioning system (GPS) receiver, for obtaining a first longitude, a first latitude, and a first altitude at a first time point, and a third longitude, a third latitude, and a third altitude at a second time point;
   an image pickup module, for focusing on a shot object, so as to obtain a first focus distance at the first time point and a second focus distance at the second time point;
   an elevation measurement device, for measuring a first elevation angle and a second elevation angle respectively formed by the image pickup device for detecting a moving speed of a shot object with a horizontal direction at the first and the second time point;
   a north finder, for measuring a first horizontal angle and a second horizontal angle respectively formed by the image pickup device for detecting a moving speed of a shot object with a due north direction at the first and the second time point; and
   an operation unit, for calculating a second longitude, a second latitude, and a second altitude of a position of the shot object at the first time point according to the first longitude, the first latitude, the first altitude, the first focus distance, the first elevation angle, and the first horizontal angle, calculating a fourth longitude, a fourth latitude, and a fourth altitude of a position of the shot object at the second time point according to the third longitude, the third latitude, the third altitude, the second focus distance, the second elevation angle, and the second horizontal angle, calculating a moving distance of the shot object according to the second longitude, the second latitude, the second altitude, the fourth longitude, the fourth latitude, and the fourth altitude, and calculating a moving speed of the shot object in a time difference according to the time difference between the first time point and the second time point as well as the moving distance.

2. The image pickup device for detecting a moving speed of a shot object according to claim 1, further comprising:
   a display unit, electrically connected to the operation unit, for displaying the moving speed.

3. A method for detecting a moving speed of a shot object, applied to an image pickup device, for obtaining a moving speed of a shot object, the method comprising:
   obtaining a first longitude, a first latitude, and a first altitude of a position of the image pickup device;
   making an image pickup module of the image pickup device focus on the shot object, and obtaining a first focus distance of the image pickup module to the shot object;
   measuring a first elevation angle formed by the image pickup device with a horizontal direction, when the image pickup module focuses on the shot object;
   measuring a first horizontal angle formed by the image pickup device with a due north direction, when the image pickup module focuses on the shot object;
   calculating a second longitude, a second latitude, and a second altitude of a position of the shot object according to the first longitude, the first latitude, the first altitude, the first focus distance, the first elevation angle, and the first horizontal angle;
   obtaining a third longitude, a third latitude, and a third altitude of a position of the image pickup device after a time difference;
   making the image pickup module of the image pickup device focus on the shot object, and obtaining a second focus distance of the image pickup module to the shot object after the time difference;
   obtaining a second elevation angle formed by the image pickup device with the horizontal direction, when the image pickup module focuses on the shot object after the time difference;
   obtaining a second horizontal angle formed by the image pickup device with the due north direction, when the image pickup module focuses on the shot object after the time difference;
   calculating a fourth longitude, a fourth latitude, and a fourth altitude of a position of the shot object after the time difference according to the third longitude, the third latitude, the third altitude, the second focus distance, the second elevation angle, and the second horizontal angle;
   calculating a moving distance of the shot object in the time difference according to the second longitude, the second latitude, the second altitude, the fourth longitude, the fourth latitude, and the fourth altitude; and
   calculating a moving speed of the shot object in the time difference according to the time difference and the moving distance.

4. The method for detecting a moving speed of a shot object according to claim 3, wherein the step of calculating the second longitude, the second latitude, and the second altitude of the position of the shot object comprises:
   calculating a first height difference and a first horizontal distance difference between the shot object and the image pickup device according to the first focus distance and the first elevation angle;
   calculating a first longitude difference and a first latitude difference between the shot object and the image pickup device according to the first horizontal distance difference and the first horizontal angle;
   aggregating the first longitude difference and the first longitude, so as to obtain the second longitude;
   aggregating the first latitude difference and the first latitude, so as to obtain the second latitude; and
   aggregating the first height difference and the first altitude, so as to obtain the second altitude.

5. The method for detecting a moving speed of a shot object according to claim 3, wherein the step of calculating the fourth longitude, the fourth latitude, and the fourth altitude of the position of the shot object after the time difference comprises:
   calculating a second height difference and a second horizontal distance difference between the shot object and the image pickup device after the time difference according to the second focus distance and the second elevation angle;
   calculating a second longitude difference and a second latitude difference between the shot object and the image pickup device after the time difference according to the second horizontal distance difference and the second horizontal angle;
   aggregating the second longitude difference and the third longitude, so as to obtain the fourth longitude;
   aggregating the second latitude difference and the third latitude, so as to obtain the fourth latitude; and
   aggregating the second height difference and the third altitude, so as to obtain the fourth altitude.

6. The method for detecting a moving speed of a shot object according to claim 3, further comprising:
   displaying the moving speed.

* * * * *